United States Patent Office 3,425,801
Patented Feb. 4, 1969

3,425,801
METHOD OF PREPARING PALLADIUM
SULFATE SOLUTION
Stephen C. Stowe, Midland, Mich., assignor to The Dow Chemical Company, Midland, Mich., a corporation of Delaware
No Drawing. Filed Oct. 15, 1965, Ser. No. 496,697
U.S. Cl. 23—117          2 Claims
Int. Cl. C01g 55/00

ABSTRACT OF THE DISCLOSURE

Stable aqueous solutions of palladium sulfate are prepared by contacting metallic palladium with aqueous sulfuric acid of 9–60 weight percent concentration at 80–150° C. and in the presence of molecular oxygen.

---

This invention relates to an improved method for preparing stable aqueous solutions of palladium sulfate.

Aqueous solutions of palladium in the form of a salt such as its sulfate, nitrate, or chloride are valuable in certain oxidation processes, particularly in processes whereby an olefin is converted to an aldehyde or ketone having the same carbon chain in its molecule. It is often desirable to have for this purpose a homogeneous solution of palladium sulfate free of anions other than sulfate.

Metallic palladium is only slowly attacked by sulfuric acid under ordinary conditions. In order to prepare a solution of palladium sulfate from the metal, even using finely divided metal such as palladium black, it has been necessary in the past to resort to using mixed concentrated nitric and sulfuric acids to dissolve the metal, then heating the resulting solution to decomposition temperature to drive off the nitrates, or to digesting metallic palladium or partially oxidized palladium with concentrated sulfuric acid at temperatures of about 300° C. The resulting reaction products must then be diluted with water within carefully defined limits of concentration and acidity to obtain a solution which will remain homogeneous upon standing. Methods such as these are described in German Auslegeschrift 1,080,994 and U.S. 2,487,077.

While these methods are effective, they require concentrated acids and very high temperatures as well as carefully defined dilution steps, all of which are disadvantageous, particularly on an industrial scale. It would be desirable to have available a single step method for making stable aqueous solutions of palladium sulfate which used more moderate temperatures and lower concentrations of acid, also the single acid rather than mixed acids.

It has now been found that an effective process having these and other desirable characteristics comprises digesting finely divided palladium metal in aqueous sulfuric acid of 9 to about 60 percent by weight concentration at a temperature of about 80–150° C. while the reaction mixture is intimately contacted with gaseous oxygen. An oxygen-containing gas such as air can be the source of oxygen and pure oxygen is preferably used under pressures from atmospheric pressure to about 100 lbs./sq. in. gauge. Higher pressures can be used but offer no significant advantage. Under these conditions, there are directly obtained stable solutions of palladium sulfate which contain as much dissolved palladium as solutions prepared by other methods, which are stable and remain homogeneous without significant precipitation even after months of storage, and which do not contain excessive proportions of acid.

The palladium employed is preferably finely divided metal such as filings or palladium black. Most desirably, metallic palladium in a form having a minimum surface area of about 50 sq. cm./g. is used to avoid overlong digestion times.

Oxygen is supplied to and contacted with the reaction mixture preferably by bubbling the gas through the acid in a total amount greater than the stoichiometric ratio of one half mole per mole of palladium reacted. The reactor is suitably designed in such a way that the bubbling gas contributes to the agitation of the liquid mixture.

Examples 1–8

In the experiments tabulated below, standard quantities of about 5 g. of 325 mesh palladium metal and 300 ml. of aqueous sulfuric acid were loaded into an upright tubular reactor constructed of heavy-walled one inch glass pipe, equipped with a dip pipe and a glass stirrer and adapted to operation under moderate pressure. Heat was supplied by an external electrical resistance heater. Oxygen was admitted through the dip pipe and bubbled through the sulfuric acid, then vented through a condenser section and a vent valve at about 100–200 ml./minute under atmospheric pressure and temperature. Pressure as indicated was maintained on the system by the vent valve. Samples were withdrawn periodically from the reactor and analyzed for weight percent dissolved palladium. Pressures are given in pounds per square inch gauge. Solutions prepared as shown in these examples remained clear without formation of precipitates upon storage for periods of six months and longer.

In the following experiments, operation outside as well as within the specified process limits is illustrated. For example, Examples 1 and 2 show the negative results obtained at too low a temperature and at too low an acid concentration respectively.

Example 1.—Temp.=60°C., pressure=40 lbs., 17.5% $H_2SO_4$

| Time, hrs.: | Wt. percent Pd |
|---|---|
| 1 | 0.02 |
| 2 | 0.03 |
| 3.75 | 0.03 |

Example 2.—Temp.=135°C., pressure=44 lbs., 4.8% $H_2SO_4$

| Time, hrs.: | Wt. percent Pd |
|---|---|
| 1.1 | 0.02 |
| 2 | 0.03 |
| 3.8 | 0.03 |

Example 3.—Temp.=135°C., pressure=44 lbs., 17.5% $H_2SO_4$

| Time, hrs.: | Wt. percent Pd |
|---|---|
| 0.3 | 0.02 |
| 1.1 | 0.12 |
| 3.8 | 0.34 |

Example 4.—Temp.=115°C., pressure=40 lbs., 9.3% $H_2SO_4$

| Time, hrs.: | Wt. percent Pd |
|---|---|
| 1.5 | 0.1 |
| 3 | 0.12 |
| 8 | 0.11 |

Example 5.—Temp.=113°C., pressure=11 lbs., 17.5% $H_2SO_4$

| Time, hrs.: | Wt. percent Pd |
|---|---|
| 0.3 | 0.055 |
| 1.1 | 0.19 |
| 3.8 | 0.35 |

Example 6.—Temp.=113°C., pressure=41 lbs., 17.5% $H_2SO_4$

| Time, hrs.: | Wt. percent Pd |
|---|---|
| 1.0 | 0.27 |
| 3.0 | 0.51 |
| 8.0 | 0.53 |

Example 7.—Temp.=113°C., pressure=45 lbs., 37.9% $H_2SO_4$

| Time, hrs.: | Wt. percent Pd |
|---|---|
| 3.5 | 0.42 |
| 5 | 0.61 |
| 9.5 | 0.87 |

Example 8.—Temp.=125°C., pressure=44 lbs., 51.8% $H_2SO_4$

| Time, hrs.: | Wt. percent Pd |
|---|---|
| 0.5 | 0.16 |
| 1.08 | 0.35 |
| 3.5 | 0.87 |
| 5.75 | 0.98 |

I claim:
1. A process for making a stable solution of palladium sulfate which comprises contacting metallic palladium with aqueous sulfuric acid of 9–60 percent by weight concentration while contacting said acid with an oxygen-containing gas at a temperature of 80–150°C., and for a time sufficient for at least a significant portion of said palladium to be dissolved as palladium sulfate.

2. The process of claim 1 wherein oxygen as the oxygen-containing gas is passed through the sulfuric acid under a pressure from normal atmospheric pressure to 100 lbs./sq. in. gauge.

References Cited

UNITED STATES PATENTS 3,294,483  12/1966  Hirschberg _____ 23—117 X

OSCAR R. VERTIZ, Primary Examiner.
EARL C. THOMAS, Assistant Examiner.

U.S. Cl. X.R.

75—121